US012783427B2

(12) United States Patent
Hu et al.

(10) Patent No.: US 12,783,427 B2
(45) Date of Patent: Nov. 3, 2026

(54) LEVERAGING AN ACCELERATOR DEVICE TO ACCELERATE HASH TABLE LOOKUPS

(71) Applicant: Intel Corporation, Santa Clara, CA (US)

(72) Inventors: Jiayu Hu, Shanghai (CN); Ren Wang, Portland, OR (US); Xuan Ding, Shanghai (CN); Cheng Jiang, Shanghai (CN); Cunming Liang, Shanghai (CN); Narayan Ranganathan, Bangalore (IN); Rajesh Sankaran, Portland, OR (US); Xiao Wang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/089,171

(22) Filed: Dec. 27, 2022

(65) Prior Publication Data

US 2023/0126783 A1 Apr. 27, 2023

(30) Foreign Application Priority Data

Nov. 15, 2022 (WO) ................ PCT/CN2022/132068

(51) Int. Cl.

| | |
|---|---|
| ***G06F 7/00*** | (2006.01) |
| ***G06F 12/1018*** | (2016.01) |
| ***G06F 16/22*** | (2019.01) |
| ***G06F 16/901*** | (2019.01) |

(52) U.S. Cl.

CPC ...... *G06F 12/1018* (2013.01); *G06F 16/2255* (2019.01); *G06F 16/9014* (2019.01); *G06F 2212/1016* (2013.01)

(58) Field of Classification Search

CPC ............. G06F 16/2255; G06F 16/9014; G06F 16/137; G06F 16/152; G06F 16/325; G06F 16/3347; G06F 16/3344; G06F 16/332; G06F 16/3322; G06F 16/35; G06F 16/24542; G06F 16/24553; G06F 16/2455; G06F 16/24522; G06F 16/2425; G06F 16/2456; G06F 16/2465; G06F 16/2471; G06F 16/24575; G06F 16/2453; G06F 16/2457; G06F 16/215; G06F 16/243; G06F 16/244; G06F 16/245; G06F 16/248; G06F 16/93; G06F 16/383; G06F 16/285; G06F 16/9535; G06F 16/3329; G06F 16/90332; G06F 16/90335; G06F 16/217; G06F 16/353; G06F 16/2282; G06F 16/122; G06F 12/1018; G06F 12/0864; G06F 2212/1016

See application file for complete search history.

(56) References Cited

U.S. PATENT DOCUMENTS

| | | | | |
|---|---|---|---|---|
| 6,320,522 B1 * | 11/2001 | Satoh | H03M 7/40 | 341/51 |
| 2003/0135369 A1 * | 7/2003 | Stoimenov | G06F 16/9014 | 704/235 |
| 2008/0052488 A1 * | 2/2008 | Fritz | G06F 12/0864 | 711/216 |
| 2009/0070354 A1 * | 3/2009 | Chellapilla | H04L 9/3247 | |
| 2022/0035737 A1 * | 2/2022 | Yasuda | G06F 12/06 | |

* cited by examiner

*Primary Examiner* — Mohammad A Sana

(74) *Attorney, Agent, or Firm* — KDW FIRM PLLC

(57) ABSTRACT

A processor may determine, based on a length of an input key, whether to compute a hash value based on the input key or cause an accelerator device coupled to the processor to compute the hash value based on the input key. The processor may cause a hash table lookup operation to be performed based on the hash value.

20 Claims, 11 Drawing Sheets

LEVERAGING AN ACCELERATOR DEVICE TO ACCELERATE HASH TABLE LOOKUPS

CROSS-REFERENCE TO RELATED APPLICATIONS

This application claims the benefit of and priority to International Application No. PCT/CN2022/132068 entitled "LEVERAGING AN ACCELERATOR DEVICE TO ACCELERATE HASH TABLE LOOKUPS" filed Nov. 15, 2022, which is hereby incorporated by reference in its entirety.

BACKGROUND

Hash table lookups are frequently executed operations in many different computing contexts. For example, hash table lookups are frequent in datacenter, networking, database, storage, or other cloud computing workloads. However, the operations associated with hash table lookups are very resource intensive and require significant processor cycles and/or other system resources to complete.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
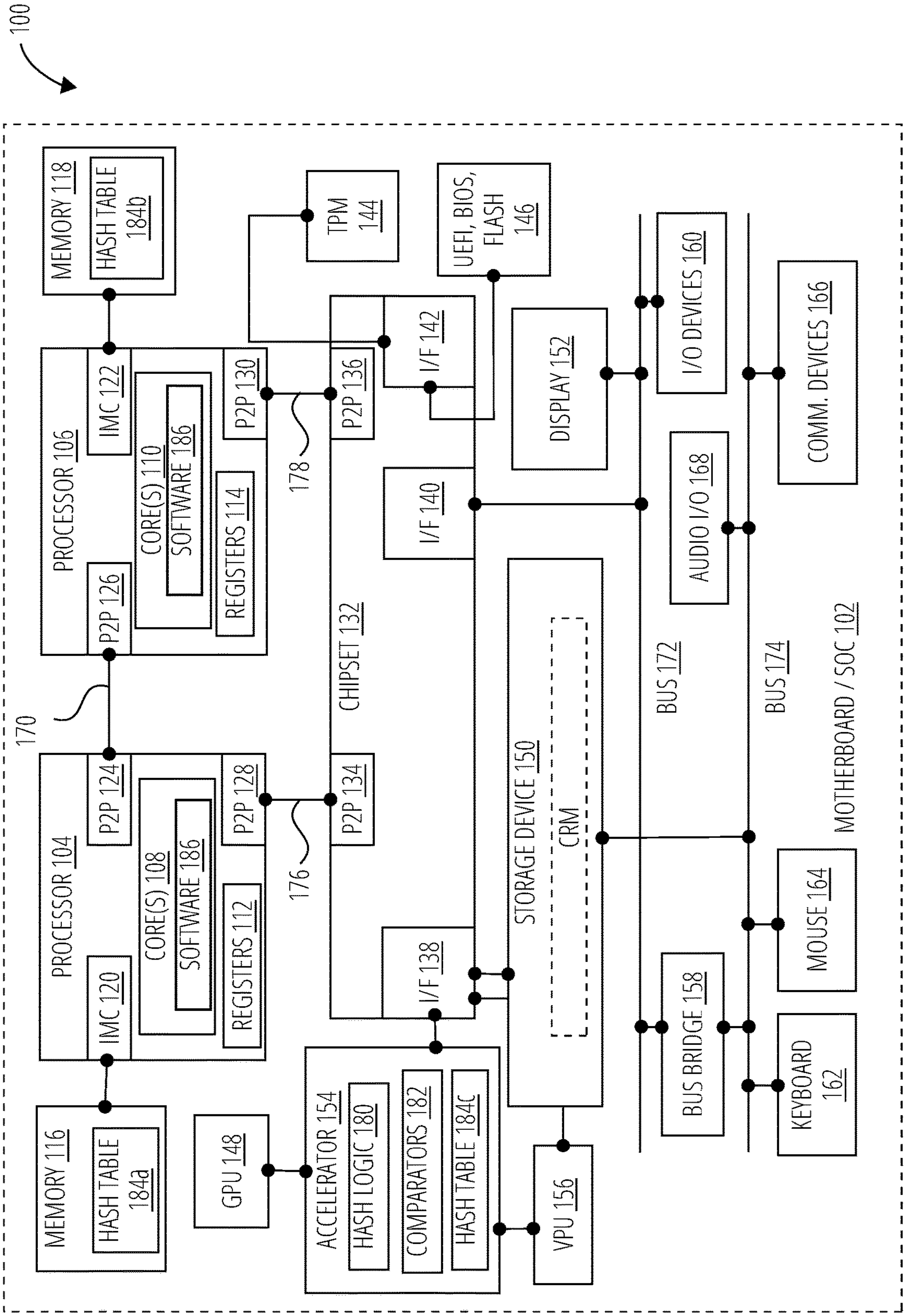
FIG. 1 illustrates an aspect of the subject matter in accordance with one embodiment.

Embodiments disclosed herein include a software-hardware co-optimization mechanism to leverage an integrated hardware accelerator and a processor to accelerate hash table lookups. More generally, embodiments disclosed herein may accelerate hash table lookups by building a processing pipeline that uses the processor and the accelerator device to take advantage of the accelerator device's improved performance relative to the processor for hash value computations and memory comparison operations while overcoming the accelerator's current inability to chain multiple operations in hardware.

A hash table lookup (or similar operations) may include computing a hash value based on an input key to obtain an index into the hash table. The index may be associated one or more entries of the hash table, where each entry may store a respective value (and/or a memory address pointing to the value). The one or more values may be compared to the input key. If there is a match between the input key and the one or more values, there may be a hit in the hash table. Otherwise, there may be a hash table miss. To accelerate the performance of these operations, embodiments disclosed herein may use one or more predetermined thresholds. The thresholds may include a hash threshold and/or a comparison threshold. Generally, if the length of the input key is greater than or equal to the hash threshold (e.g., a threshold of 16 bytes, etc.), the processor may offload the hash computation to the accelerator 154. Otherwise, if the length of the input key is less than the threshold, the processor may compute the hash value. The processor may then index the hash table using the hash value to receive one or more entries in the hash table that share the same hash value. To determine if there is a hit or miss in the hash table, the entries returned from the hash table are compared to the input key.

The processor may then determine whether the length of the input key (and/or the length of the returned entries from the hash value) exceeds the comparison threshold. If the length of the input key is greater than or equal to the comparison threshold (e.g., a threshold of 16 bytes, etc.), the processor may offload the comparison operations to the accelerator 154. Otherwise, if the length of the input key is less than the comparison threshold, the processor may perform the comparison operations. A result of the comparisons may indicate whether there was a hit or a miss in the hash table.

Furthermore, embodiments disclosed herein provide an asynchronous programming model to implement the processing pipeline to overcome the latency between the processor and the accelerator. Without the asynchronous model, the processor may be blocked after sending an instruction to the accelerator device. Advantageously, however, the asynchronous model allows the processor to continue to perform other operations and receive results from the accelerator via a polling mechanism and/or an interrupt received from the accelerator. The asynchronous programming model may include a hash submission stage and a hash completion stage. In the hash submission stage, a hash value is computed based on an input key by the processor or the accelerator based on a length of the input key and the threshold (e.g., by the processor if the input key length is less than the threshold, or by the accelerator if the input key length is greater than the threshold). Furthermore, if the processor core computes the hash value, in some embodiments, the processor may complete the hash table lookup (including key retrieval from the hash table, comparing the retrieved keys to the input key, and determining whether there was a hit or miss for each comparison).

The completion stage may include two sub-stages, including a hash completion sub-stage and a compare completion substage. Generally, in the completion stage, the processor receives results from the accelerator. In the hash completion sub-stage, the processor processes any of the received results that are related to hashing operations (e.g., results that include a hash value computed based on an input key). To complete the hash-completion sub stage, the processor obtains an index of a bucket (e.g., an index corresponding to the received hash value) in the hash table and receives key pairs corresponding to this index from the hash table. The processor may then send each key pair to the accelerator for comparison with the input key.

In the completion sub-stage, the processor may receive compare results from the accelerator. The results may indicate whether there was a hit or a miss for each comparison operation performed by the accelerator. The processor may then identify each result that is associated with the input key, as the results may include results associated with other input keys. The processor then determines whether one or more of the results for the input key indicate a hash table hit (e.g., a comparison resulted in a match). If there is a match, there is a hit in the hash table. If there are additional received results associated with the input key remaining to be processed, the processor may invalidate the additional results to avoid processing these results unnecessarily. If, however, a hit is not identified, the processor may process the additional results to determine if there is a hit in the hash table.

Further still, embodiments disclosed herein provide techniques to avoid bottlenecks associated with comparison operations performed by the accelerator. Generally, the processor may transmit a descriptor to the accelerator to cause the accelerator to perform hash computations and/or comparison operations. However, the processor may also transmit a batch descriptor, which includes a plurality of such descriptors. In such an embodiment, the processor may include, in one of the plurality of descriptors, an indication to enable an "expected result" feature of the accelerator, which allows the accelerator to stop processing the descriptors when identifying the indication in one of the descriptors and having identified a hit in one or more previous descriptors. For example, if a batch descriptor includes 32 descriptors, an indication (e.g., a flag) may be set in the 16th descriptor to enable the "expected result" feature. The accelerator may then process the descriptors zero through 15, and encounter the flag in the 16th descriptor. If the accelerator identified a hit (e.g., a match) in one of the descriptors zero through 15, the accelerator may refrain from processing the remaining descriptors (e.g., descriptors 16 through 31) to conserve resources. If, however, a hit was not identified in the first 16 descriptors, the "expected result" feature is not triggered and the accelerator continues to process the remaining descriptors.

Advantageously, embodiments disclosed herein improve the performance of computing systems that process hash table lookups by selectively using an accelerator device to perform hash computations and/or comparison operations. By providing an asynchronous programming model to process hash table lookups, the performance of the accelerator and associated system are improved by allowing multiple operations to be chained in the accelerator, which conventionally is unable to chain hash computation and comparison operations required to process hash table lookups. Furthermore, by refraining from performing additional operations (e.g., refraining from performing additional comparison operations when a hit is detected), performance of the accelerator, the processor, and/or the system is improved.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 121 illustrated as components 121-1 through 121-a may include components 121-1, 121-2, 121-3, 121-4, and 121-5. The embodiments are not limited in this context.

Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

FIG. 1 illustrates an embodiment of a system 100. The system 100 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 100 may have a single processor with one core or more than one processor. Note that the term "processor" refers to a processor with a single core or a processor package with multiple processor cores. More generally, the computing system 100 is configured to implement all logic, systems, logic flows, methods, apparatuses, and functionality described herein with reference to FIGS. 1-10.

As used in this application, the terms "system" and "component" and "module" are intended to refer to a computer-related entity, either hardware, a combination of hardware and software, software, or software in execution, examples of which are provided by the exemplary system 100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 1, system 100 comprises a motherboard or system-on-chip (SoC) 102 for mounting platform components. Motherboard or system-on-chip (SoC) 102 is a point-to-point (P2P) interconnect platform that includes a first processor 104 and a second processor 106 coupled via a point-to-point interconnect 170 such as an Ultra Path Interconnect (UPI). In other embodiments, the system 100 may be of another bus architecture, such as a multi-drop bus. Furthermore, each of processor 104 and processor 106 may be processor packages with multiple processor cores including core(s) 108 and core(s) 110, respectively. While the system 100 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 104 and chipset 132. Some platforms may include additional components and some platforms may only include sockets to mount the processors and/or the chipset. Furthermore, some platforms may not have sockets (e.g. SoC, or the like). Although depicted as a motherboard or SoC 102, one or more of the components of the motherboard or SoC 102 may also be included in a single die package, a multi-chip module (MCM), a multi-die package, a chiplet, a bridge, and/or an interposer. Therefore, embodiments are not limited to a motherboard or a SoC.

The processor 104 and processor 106 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 104 and/or processor 106. Additionally, the processor 104 need not be identical to processor 106.

Processor 104 includes an integrated memory controller (IMC) 120 and point-to-point (P2P) interface 124 and P2P interface 128. Similarly, the processor 106 includes an IMC 122 as well as P2P interface 126 and P2P interface 130. IMC 120 and IMC 122 couple the processors processor 104 and processor 106, respectively, to respective memories (e.g., memory 116 and memory 118). Memory 116 and memory 118 may be portions of the main memory (e.g., a dynamic random-access memory (DRAM)) for the platform such as double data rate type 3 (DDR3) or type 4 (DDR4) synchronous DRAM (SDRAM). In the present embodiment, the memory 116 and the memory 118 locally attach to the respective processors (i.e., processor 104 and processor 106). In other embodiments, the main memory may couple with the processors via a bus and shared memory hub. Processor 104 includes registers 112 and processor 106 includes registers 114.

System 100 includes chipset 132 coupled to processor 104 and processor 106. Furthermore, chipset 132 can be coupled to storage device 150, for example, via an interface (I/F) 138. The I/F 138 may be, for example, a Peripheral Component Interconnect-enhanced (PCIe) interface, a Compute Express Link® (CXL) interface, or a Universal Chiplet Interconnect Express (UCIe) interface. Storage device 150 can store instructions executable by circuitry of system 100 (e.g., processor 104, processor 106, GPU 148, accelerator 154, vision processing unit 156, or the like).

Processor 104 couples to the chipset 132 via P2P interface 128 and P2P 134 while processor 106 couples to the chipset 132 via P2P interface 130 and P2P 136. Direct media interface (DMI) 176 and DMI 178 may couple the P2P interface 128 and the P2P 134 and the P2P interface 130 and P2P 136, respectively. DMI 176 and DMI 178 may be a high-speed interconnect that facilitates, e.g., eight Giga Transfers per second (GT/s) such as DMI 3.0. In other embodiments, the processor 104 and processor 106 may interconnect via a bus.

The chipset 132 may comprise a controller hub such as a platform controller hub (PCH). The chipset 132 may include a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 132 may comprise more than one controller hub such as a chipset with a memory controller hub, a graphics controller hub, and an input/output (I/O) controller hub.

In the depicted example, chipset 132 couples with a trusted platform module (TPM) 144 and UEFI, BIOS, FLASH circuitry 146 via I/F 142. The TPM 144 is a dedicated microcontroller designed to secure hardware by integrating cryptographic keys into devices. The UEFI, BIOS, FLASH circuitry 146 may provide pre-boot code.

Furthermore, chipset 132 includes the I/F 138 to couple chipset 132 with a high-performance graphics engine, such as, graphics processing circuitry or a graphics processing unit (GPU) 148. In other embodiments, the system 100 may include a flexible display interface (FDI) (not shown) between the processor 104 and/or the processor 106 and the chipset 132. The FDI interconnects a graphics processor core in one or more of processor 104 and/or processor 106 with the chipset 132.

Various I/O devices 160 and display 152 couple to the bus 172, along with a bus bridge 158 which couples the bus 172 to a second bus 174 and an I/F 140 that connects the bus 172 with the chipset 132. In one embodiment, the second bus 174 may be a low pin count (LPC) bus. Various devices may couple to the second bus 174 including, for example, a keyboard 162, a mouse 164 and communication devices 166.

Furthermore, an audio I/O 168 may couple to second bus 174. Many of the I/O devices 160 and communication devices 166 may reside on the motherboard or SoC 102 while the keyboard 162 and the mouse 164 may be add-on peripherals. In other embodiments, some or all the I/O devices 160 and communication devices 166 are add-on peripherals and do not reside on the motherboard or SoC 102.

Additionally, accelerator 154 and/or vision processing unit 156 can be coupled to chipset 132 via I/F 138. The accelerator 154 is representative of any type of accelerator device (e.g., a data streaming accelerator, cryptographic accelerator, cryptographic co-processor, an offload engine, etc.). One example of an accelerator 154 is the Intel® Data Streaming Accelerator (DSA). The accelerator 154 may be a device including circuitry to accelerate copy operations, data encryption, hash value computation, data comparison operations (including comparison of data in memory 116 and/or memory 118), and/or data compression. For example, the accelerator 154 may be a USB device, PCI device, PCIe device, CXL device, UCIe device, and/or an SPI device. The accelerator 154 can also include circuitry arranged to execute machine learning (ML) related operations (e.g., training, inference, etc.) for ML models. Generally, the accelerator 154 may be specially designed to perform computationally intensive operations, such as hash value computations, comparison operations, cryptographic operations, and/or compression operations, in a manner that is more efficient than when performed by the processor 104 or processor 106. Because the load of the system 100 may include hash value computations, comparison operations, data copying operations, cryptographic operations, and/or compression operations, the accelerator 154 can greatly increase performance of the system 100 for these operations. However, offloading all hash value computation and comparison operations from the processors 104, 106 to the accelerator 154 will result in sub-optimal performance due to latency (e.g., when the key lengths are short and the processors 104, 106 can suitably perform these operations). Advantageously, however, embodiments disclosed herein adaptively offload both hashing and comparison operations based on key sizes. Furthermore, for hash tables with large numbers of entries, embodiments disclosed herein may leverage an expected result feature of the accelerator 154 to perform efficient comparison operations to complete hash table lookups.

The accelerator 154 may include one or more dedicated work queues and one or more shared work queues (each not pictured). Generally, a shared work queue is configured to store descriptors submitted by multiple software entities, such as the software 186. The software 186 may be any type of executable code, such as a process, a thread, an application, a virtual machine, a container, a microservice, etc., that share the accelerator 154. For example, the accelerator 154 may be shared according to the Single Root I/O virtualization (SR-IOV) architecture and/or the Scalable I/O virtualization (S-IOV) architecture. Embodiments are not limited in these contexts. In some embodiments, software 186 uses an instruction to atomically submit the descriptor to the accelerator 154 via a non-posted write (e.g., a deferred memory write (DMWr)). One example of an instruction that atomically submits a work descriptor to the shared work queue of the accelerator 154 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 154. The dedicated work queue may accept job submissions via commands such as the movdir64b instruction.

As stated, the accelerator 154 may be leveraged to improve the performance of the system 100 when processing hash table lookup operations, e.g., lookups in one or more of the hash tables 184*a*, 184*b*, and/or 184*c*. Generally, a hash table is a data structure that implements an associative array or dictionary to map keys to values. For example, a hash table may map input data to various values, where the input data and the mapped values can be fixed sized and/or of variable sizes. A hash value computed based on the input data may map arbitrary sized input data to a fixed-sized numeric value.

Generally, software 186 executing on processors 104, 106 may need to determine whether an input key is stored in the hash table. Examples of software 186 that uses hash table lookups include networking software (e.g., for flow classification, deep packet inspection, etc.), database software (e.g., for accessing key-value-store databases), garbage collection software that uses tree traversal, storage software, artificial intelligence and/or machine learning software (e.g., for locality sensitive hashing, hash-based similarity searches such as image similarity searches, pruning neural networks, and embedding table lookups).

Figure 2:
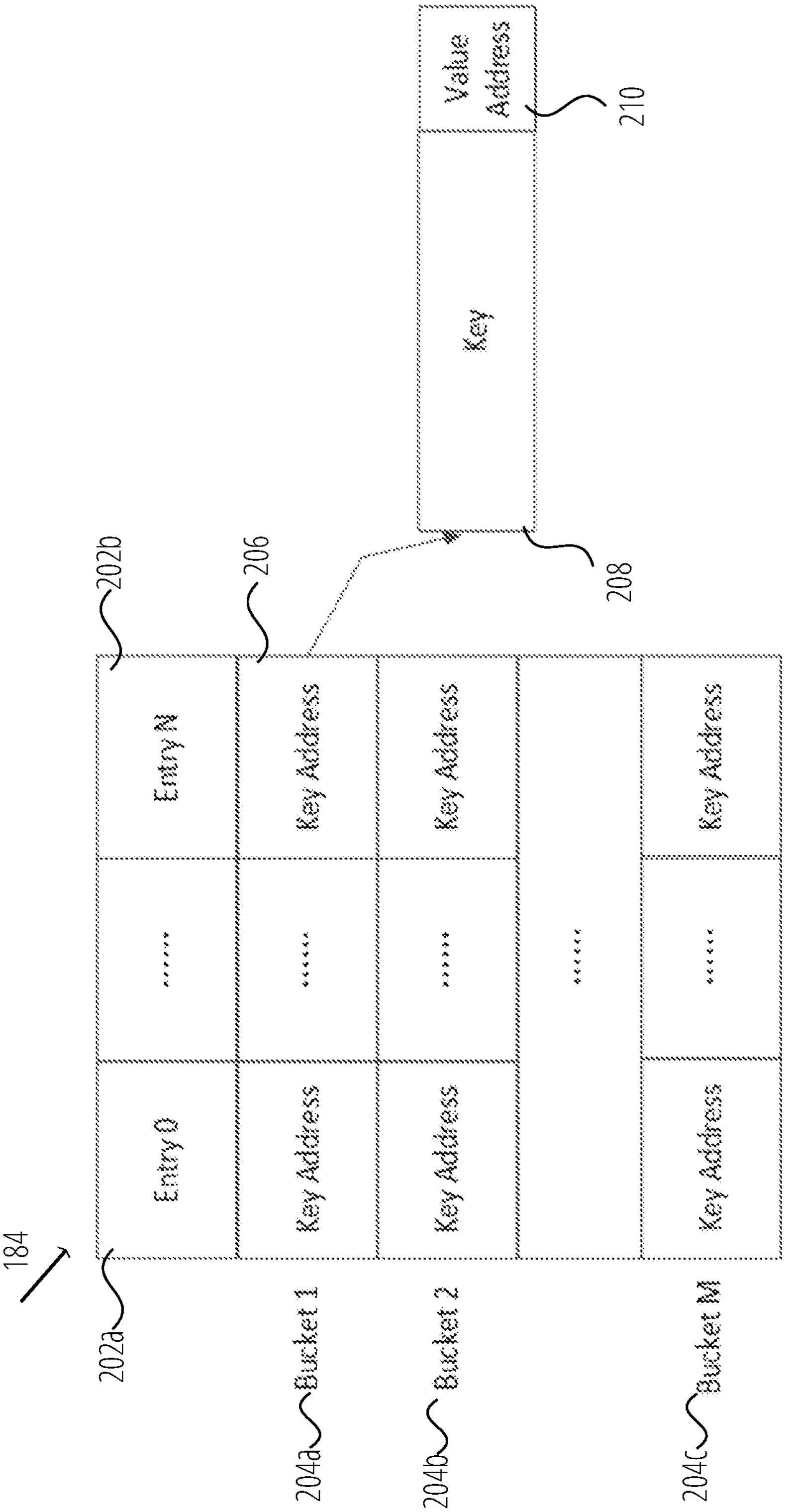
FIG. 2 illustrates an aspect of the subject matter in accordance with one embodiment.

FIG. 2 depicts an example hash table 184, which is a representative example of any one of the hash tables 184*a*, 184*b*, and/or 184*c*. As shown, the hash table 184 includes a plurality of buckets, including buckets 204*a*, 204*b*, and 204*c*. Each bucket 204*a*-204*c* is associated with an index value (not pictured) that uniquely identifies each bucket. The index value may be obtained by computing a hash value based on an input key. For example, bucket 204*a* may be identified by the example hash value of "12345678" and bucket 204*b* may be identified by the example hash value of "87654321". Any suitable function may be used to compute a hash value, such as a cyclic redundancy check (CRC) function. As shown, each bucket 204*a*-204*c* includes a plurality of entries 202*a*-202*b*. In one example, each bucket may include eight entries. However, any number of entries may be used. Each entry stores a memory address of a key. For example, entry 206 of bucket 204*a* includes a memory address of a key 208 that has an associated value address 210 of a value of the key 208.

A hash table lookup therefore determines whether or not an input key is present in the hash table. Generally, if an input key is present, there is a "hit" in the hash table. Otherwise, the input key is not present, and there is a "miss" in the hash table.

Figure 3:
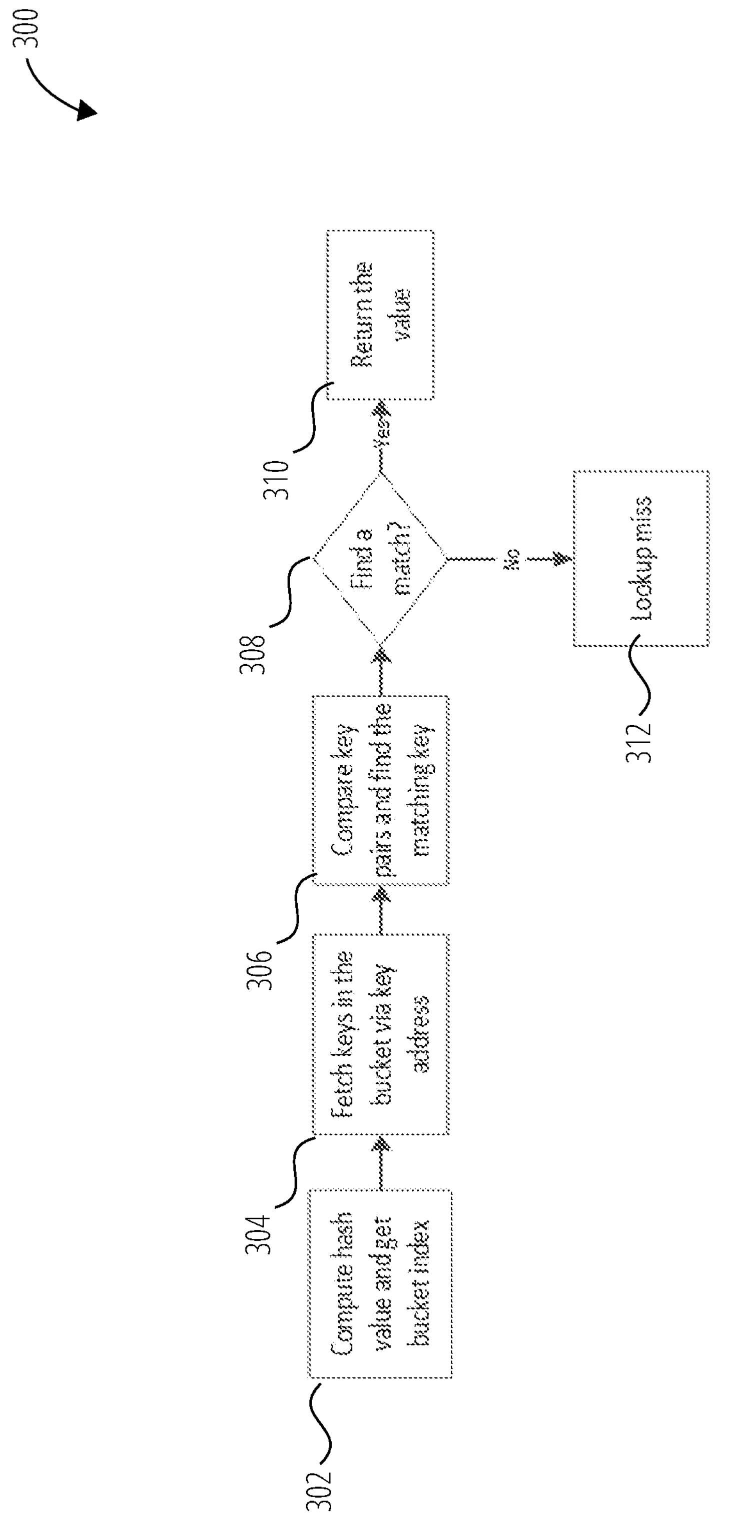
FIG. 3 illustrates a logic flow 300 in accordance with one embodiment.

FIG. 3 illustrates a logic flow 300 for performing hash table lookups, e.g., in one or more of the hash tables 184*a*, 184*b*, and/or 184*c*. For example, software 186 executing on processors 104, 106 may need to determine whether an input key is present in the hash table. The embodiments are not limited in this context.

As shown, at block 302, logic flow 300 may compute a hash value based on an input key provided by software, e.g., software 186. The cycle count required to compute the hash value is based on a length of the input key. The computed hash value may be an index into one of the buckets 204*a*-204*c* of the hash table. At block 304, the logic flow 300 may receive one or more keys based on the index value. For example, if the index value computed based on the hash function corresponds to the address of bucket 204*a*, the key addresses of bucket 204*a* may be returned. The key values at each address may then be accessed.

At block 306, the logic flow 300 compares the accessed key values to the input key to determine if a match exists. At block 308, the logic flow 300 determines whether a match exists. If a match exists, at block 310, a "hit" is detected, and the value is returned. For example, if the input key matches the key 208 associated with the key address of entry 206 in bucket 204*a*, a hit is detected, and the value at value address 210 may be returned. Otherwise, if no matches are found, a "miss" is detected at block 312.

During the logic flow 300, most of the processor cycles are spent on several operations, including computing hash values (such as CRC values), loading the hash table bucket entries from memory, and comparing the keys in each bucket entry to the input key. For example, the cycle count needed to compute the hash value is proportional to the length of the input key. Similarly, most of the processor cycles are also spent on loading the bucket from the hash table data structure. When a hash table is too large, loading the table from memory may cause the processor to stall and wait for data to be fetched from memory. Since memory access for the hash table is random, prefetching may not be beneficial. Furthermore, key comparison consumes many processor cycles, with larger keys requiring more processor cycles to complete a comparison. Even with software optimizations, this overhead is limited by the arithmetic logic unit (ALU) (not pictured) and limited pipeline depth of the processors 104, 106.

Returning to FIG. 1, the accelerator 154 may perform the hash computations and comparisons of a hash table lookup faster than the processors 104, 106. However, the accelerator 154 is not designed to natively process hash table lookups, as the accelerator 154 is not capable of chaining the operations (e.g., the hash computations, comparisons, etc.) for the hash table lookup. Instead, the accelerator 154 is configured to perform the hash computations and comparison operations separately. Stated differently, the accelerator 154 cannot receive the input key specified in a command (e.g., a descriptor) from the processors 104, 106, perform the hash computation, identify the relevant bucket and associated keys therein, perform the comparison operations, and return the corresponding value(s) (in the event of a hash table hit) as the result.

For example, a descriptor generated by the processors 104, 106 to instruct the accelerator 154 to perform operations contains a memory address which is translated by the respective cores 108, 110. A read buffer of the processors 104, 106 may store the content of the translated address, which may be read by the accelerator 154 to perform the associated operations. The results of the operations performed by the accelerator 154 may then be written to a write buffer to be sent back to the requesting processor. Therefore, this single data pipeline means that the accelerator 154 is able to compute a hash value or perform a comparison operation, but it cannot perform both operations in a single iteration for hash table lookups, as the accelerator 154 does not have recirculation functionality and cannot process the bucket index produced by the hash computation based on the input key. Furthermore, the processors 104, 106 may perform these operations more efficiently than the accelerator 154 (when latency is considered) at small input key sizes. Therefore, assigning all hash computation and comparison operations to the accelerator 154 may result in sub-optimal hash table lookup processing.

Advantageously, however, the accelerator 154 includes circuitry for a hash logic 180 and one or more comparators 182. The hash logic 180 is circuitry configured to compute a value based on an input value (e.g., an input key) and according to a function. The accelerator 154 may use any suitable function may to compute a hash value, such as a cyclic redundancy check (CRC) function. Doing so allows the hash logic 180 to map input data of an arbitrary size to fixed-size values, e.g., map an input key to an index of a bucket in the hash tables 184*a*-184*c*. The comparators 182 include circuitry to compare values and return a result of the comparison (e.g., a match or not a match). The comparators 182 are further configured to compare data at different memory locations based on the respective memory addresses. Therefore, the accelerator 154 may be a direct memory access (DMA) accelerator. For example, the comparators 182 may compare data at a first memory address in memory 116 to data at a second memory address in memory 118 based on the first and second memory addresses. In some embodiments, comparators 182 may compare data stored in different locations of memory (not pictured) of the accelerator 154 device, e.g., in the hash table 184*c*. In some embodiments the comparators 182 may compare data stored in the hash table 184*c* and one of the hash tables 184*a*, 184*b*.

Although the circuitry of the accelerator 154 can perform the hash computations and comparison operations faster than the processors 104, 106, the latency incurred may diminish any time and/or resource savings realized by having the accelerator 154 perform the hash computations and comparison operations. Therefore, in some embodiments, one or more predetermined thresholds may be leveraged by the system 100 when determining whether to offload hash computations and/or comparison operations to the accelerator 154. The thresholds may be specified by software 186 and/or hardware (e.g., stored in a suitable component of the system 100). For example, the thresholds may include a hash threshold and/or a comparison threshold. The hash threshold may define a minimum key length, which, if exceeded by the input key, causes the processors 104, 106 to offload hash computation operations to the accelerator 154. Similarly, the comparison threshold may define a minimum key length, which, if exceeded by the input key, causes the processors 104, 106 to offload comparison operations to the accelerator 154.

Generally, if the length of the input key is greater than or equal to the hash threshold (e.g., a threshold of 32 bytes, etc.), the processors 104, 106 may offload the hash computation to the accelerator 154. Otherwise, if the length of the input key is less than the hash threshold, the processors 104, 106 may compute the hash value. Similarly, if the length of the input key (and/or the length of the returned entries from the hash value) exceeds the comparison threshold (e.g., a threshold of 32 bytes, etc.), the processors 104, 106 may offload the comparison operations to the accelerator 154. Otherwise, if the length of the input key is less than the comparison threshold, the processors 104, 106 may perform the comparison operations. In some embodiments, a single threshold is used (e.g., the greater of the hash threshold and the comparison threshold). In some embodiments, the decision of whether to offload hash value computation and/or key comparison operations to the accelerator 154 may be selectively enabled and/or disabled. For example, an OS or hypervisor executing on the system 100 may enable and/or disable the offload decisioning. As another example, the software 186 and/or a management console may enable and/or disable the offload decisioning.

Figure 4:
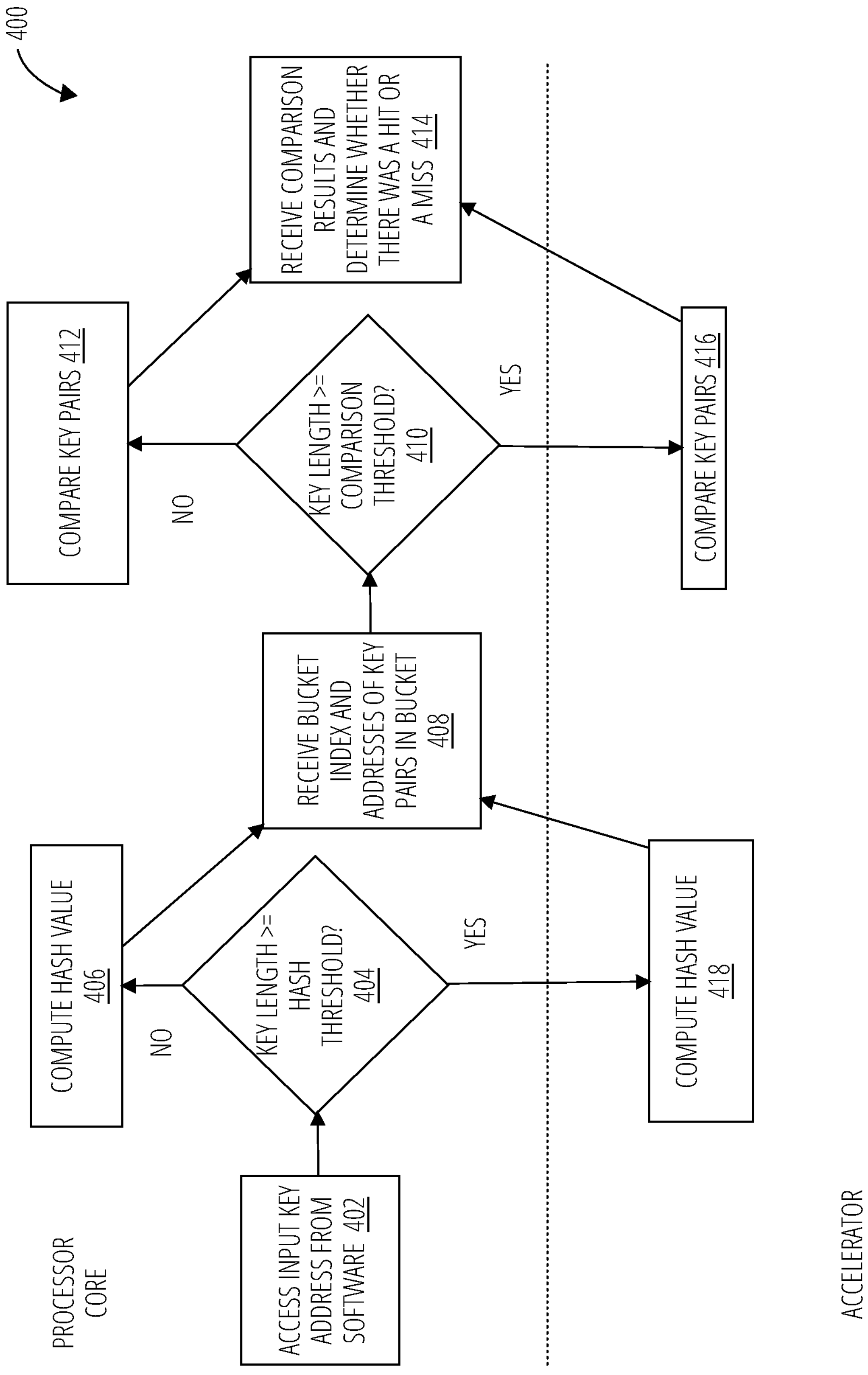
FIG. 4 illustrates a logic flow 400 in accordance with one embodiment.

FIG. 4 illustrates an example logic flow 400. The logic flow 400 may be representative of some or all of the operations executed by one or more embodiments described herein. For example, the logic flow 400 may include some or all of the operations performed by performed by the system 100 to use the accelerator 154 to accelerate hash table lookups based on a hash threshold and a comparison threshold. In FIG. 4, items above the dotted line are performed by a processor core (e.g., one or more of the core(s) 108, 110), while items below the dotted line are performed by the accelerator 154. For the sake of clarity, the logic flow 400 is described with reference to core 108 of processor 104. The embodiments are not limited in this context.

As shown, at block 402, the processor core 108 of processor 104 may receive or otherwise access a memory address of an input key specified by software 186. For example, software 186 may specify an input key of 32 bytes in length for lookup in any one of the hash tables 184*a*-184*c*. At decision block 404, the core 108 of processor 104 determines whether the length of the input key is greater than or equal to the hash threshold. If the length of the input key is less than the hash threshold, the logic flow 400 proceeds to block 406. If the length of the input key is greater than or equal to the hash threshold, the logic flow 400 proceeds to block 418.

For example, if the hash threshold is 16 bytes and the input key is 32 bytes in length, the core 108 of processor 104 may determine to offload the hash computation to the accelerator 154 at decision block 404. For example, the core 108 of processor 104 may generate a descriptor that includes, as parameters, a memory address of the input key and an indication (e.g., an operation code, or "opcode") specifying to perform the hash computation. Once the accelerator 154 receives and processes the descriptor, the hash logic 180 of accelerator 154 may compute a hash value based on the input key at block 418. The accelerator 154 may then return the computed hash value (e.g., an index value for the hash tables 184*a*-184*c*), and the logic flow 400 may proceed to block 408.

As another example at decision block 404, if the hash threshold is 64 bytes and the input key is 32 bytes in length, then the core 108 of processor 104 may determine to proceed to block 406, where the core 108 of processor 104 computes a hash value based on the input key. The logic flow 400 may then proceed to block 408.

At block 408, the core 108 of processor 104 receives the bucket index (e.g., the hash value computed by the accelerator 154 at block 418 or the hash value computed by the core 108 at block 406). The bucket index may correspond to one of the buckets 204*a*-204*c* of the hash table 184*a*-184*c*. As such, the core 108 of processor 104 may access the key addresses in the bucket. For example, if eight entries are present in the bucket, eight key addresses may be accessed at block 408. At decision block 410, the core 108 of processor 104 determines whether the length of the input key is greater than or equal to the comparison threshold. If the key length is less than the comparison threshold, the logic flow proceeds to block 412, where core 108 of processor 104 may compare each key accessed at block 408 to the input key. Continuing with the previous example, if eight key addresses are accessed at block 408, the core 108 of processor 104 may compare the input key to each key (e.g., based on the values at the respective addresses, such that the input key is compared to the keys stored in the hash table bucket), resulting in at least eight comparison operations. The logic flow 400 may then proceed to block 414.

Returning to decision block 410, if the length of the input key is greater than or equal to the comparison threshold, the core 108 of processor 104 determines to offload the comparison operations to the accelerator 154. To do so, the core 108 of processor 104 may generate a descriptor for each key address in the identified bucket. Continuing with the previous example, if eight key addresses are accessed at block 408, the core 108 of processor 104 may generate eight descriptors. Each descriptor may include the memory address of the input key, the respective key address from the bucket 204*a*, and an opcode specifying to perform a comparison operation. In some embodiments, when multiple comparison operations are needed, a batch descriptor including a plurality of descriptors may be generated. Continuing with the previous example, the batch descriptor may include eight distinct descriptors, one descriptor for each of the eight comparison operations. At block 416, the accelerator 154 may receive the descriptor(s) and the comparators 182 may perform the respective comparison operations. The accelerator 154 may then return a respective response to the processors 104, 106 for each of the comparisons. Each response may indicate the input key address and a result (e.g., whether the comparison resulted in a match or did not result in a match).

At block 416, the core 108 of processor 104 receives the comparison results (e.g., from the accelerator 154 and/or the core 108 of processor 104) and processes the received results to determine whether there was a hit or miss in the hash table. If there is a hit, the corresponding value may be returned. For example, if the key 208 is a hit based on the input key, the value address 210 may be returned to software 186. Otherwise, an indication of a miss may be returned to software 186.

Advantageously, embodiments disclosed herein leverage the accelerator 154 to perform hash table lookup operations when doing so may improve the performance of the system 100 (e.g., when the length of the key exceeds the hash threshold and/or the comparison threshold). Furthermore, in some embodiments, the accelerator 154 may perform one set of operations (e.g., the hash computation) while the processor 104 may perform the other set of operations (e.g., the comparisons). As another example, the processor 104 may perform the hash computation, while the accelerator 154 may perform the comparisons. Similarly, some or all of these features may be selectively enabled and/or disabled, e.g., via an OS, hypervisor, the software 186, etc. The embodiments are not limited in these contexts.

Figure 5:
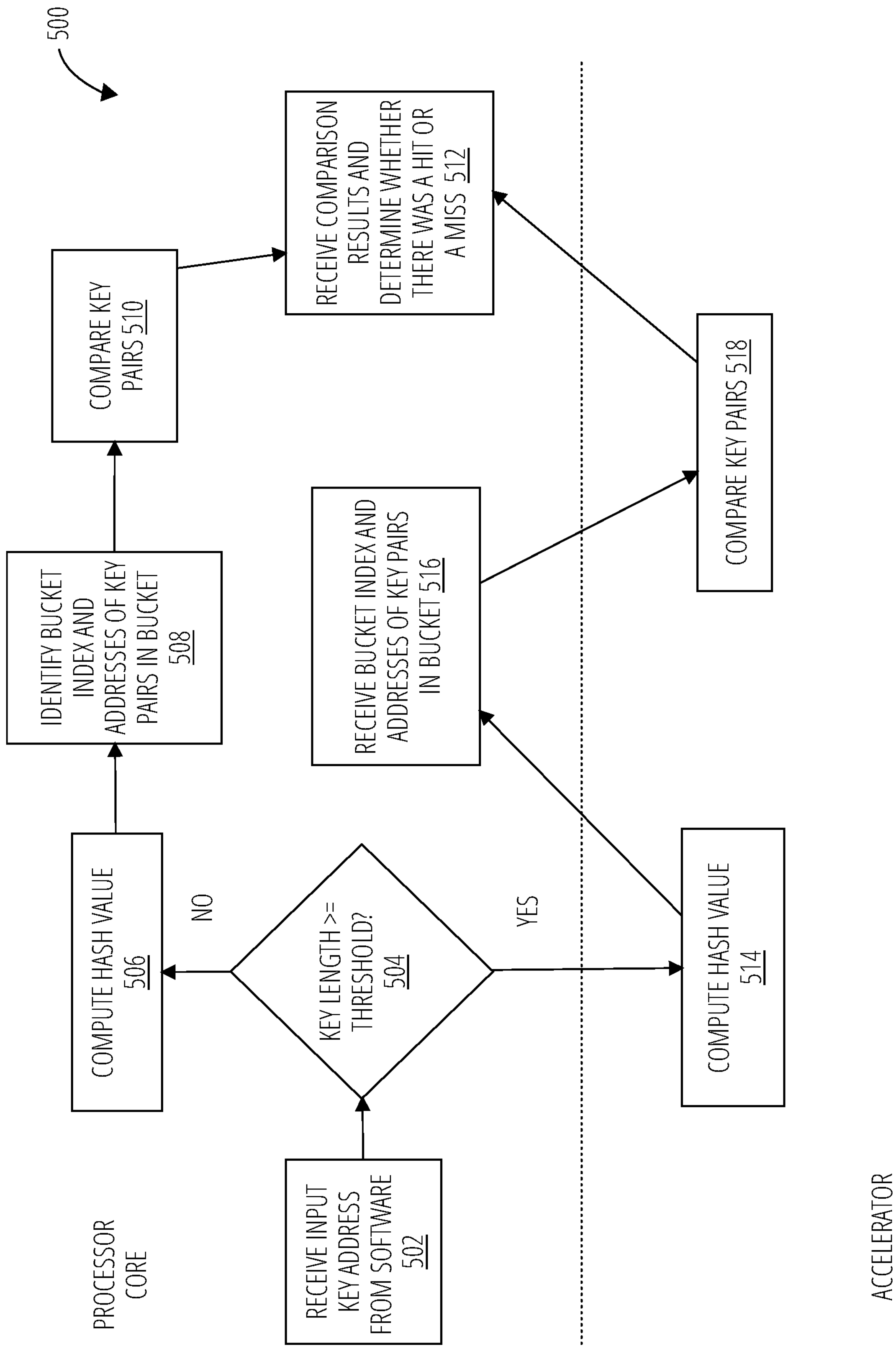
FIG. 5 illustrates a logic flow 500 in accordance with one embodiment.

FIG. 5 illustrates an example logic flow 500. The logic flow 500 may be representative of some or all of the operations executed by one or more embodiments described herein. For example, the logic flow 500 may include some or all of the operations performed by performed by the system 100 to use the accelerator 154 to accelerate hash table lookups based on a single threshold. The threshold may be the greater of the hash threshold and the comparison threshold may be selected as the predetermined threshold. In FIG. 5, items above the dotted line are performed by a processor core (e.g., one or more of the core(s) 108, 110), while items below the dotted line are performed by the accelerator 154. For the sake of clarity, the logic flow 500 is described with reference to core 108 of processor 104. The embodiments are not limited in this context.

In block 502, the processor core 108 of processor 104 may receive or otherwise access a memory address of an input key specified by software 186. For example, software 186 may specify an input key of 64 bytes in length for lookup in any one of the hash tables 184*a*-184*c*. In decision block 504, the core 108 of processor 104 determines whether the length of the input key is greater than or equal to a threshold length. The threshold length may be one of the hash threshold, the comparison threshold, or any other predetermined threshold. In some embodiments, the threshold length is the greater of the hash threshold and the comparison threshold. If the length of the input key is less than the threshold length, the logic flow 500 proceeds to block 506. If the length of the input key is greater than or equal to the threshold length, the logic flow 500 proceeds to block 514.

For example, if the threshold length is 16 bytes and the input key is 64 bytes, the core 108 of processor 104 may determine to offload the hash computation to the accelerator 154 at decision block 504. For example, the core 108 of processor 104 may generate a descriptor that includes, as parameters, a memory address of the input key and an indication (e.g., an operation code, or "opcode") specifying to perform the hash computation. Once the accelerator 154 receives and processes the descriptor, the hash logic 180 of accelerator 154 may compute a hash value based on the input key at block 514. The accelerator 154 may then return the computed hash value (e.g., an index value for the hash tables 184*a*-184*c*), and the logic flow 500 may proceed to block 516.

At block 516, the core 108 of processor 104 receives the bucket index (e.g., the hash value computed by the accelerator 154 at block 514. The bucket index may correspond to one of the buckets 204*a*-204*c* of the hash table 184*a*-184*c*. As such, the core 108 of processor 104 may access the key addresses in the bucket. For example, if six entries are present in the bucket, six key addresses may be accessed at block 516. The processor 104 may then offload the comparison operations to the accelerator 154. To do so, the core 108 of processor 104 may generate a descriptor for each key address in the identified bucket. Continuing with the previous example, if six key addresses are accessed at block 516, the core 108 of processor 104 may generate six descriptors. Each descriptor may include the memory address of the input key, the respective key address from the identified bucket, and an opcode specifying to perform a comparison operation. In some embodiments, when multiple comparison operations are needed, a batch descriptor including a plurality of descriptors may be generated. Continuing with the previous example, the batch descriptor may include six distinct descriptors, one descriptor for each of the six comparison operations. At block 518, the accelerator 154 may receive the descriptor(s) and the comparators 182 may perform the respective comparison operations. The accelerator 154 may then return a respective response to the processors 104, 106 for each of the comparisons. Each response may indicate the input key address and a result (e.g., whether the comparison resulted in a match or did not result in a match). The logic flow 500 may then proceed to block 512.

Returning to decision block 504, if the length of the input key is less than the threshold length, the core 108 of processor 104 determines to compute the hash value based on the input key. At block 506, the core 108 of processor 104 computes the hash value based on the input key. At block 508, the core 108 of processor 104 identifies the bucket index (e.g., the hash value computed at block 506. The bucket index may correspond to one of the buckets 204*a*-204*c* of the hash table 184*a*-184*c*. As such, the core 108 of processor 104 may access the key addresses in the bucket. For example, if four entries are present in the bucket, four key addresses may be accessed at block 508. At block 508, the core 108 compares the input key to each key address identified at block 506. Continuing with the previous example, if six addresses are identified at block 508, the processor 104 may perform six comparison operations. The logic flow 500 may then proceed to block 512.

At block 512, the processor 104 receives the comparison results from one of blocks 510 or 518. The processor 104 may process the received results to determine whether there was a hit or miss in the hash table. If there is a hit, the corresponding value may be returned. For example, if the key 208 is a hit based on the input key, the value address 210 may be returned to software 186. Otherwise, an indication of a miss may be returned to software 186.

There may be considerable latency between the processors 104, 106 and the accelerator 154. For example, the cores of processors 104, 106 may conventionally be blocked when submitting a descriptor to the accelerator 154, e.g., the cores may not be able to perform additional operations while waiting for the accelerator 154 to respond. Advantageously, embodiments disclosed herein include an asynchronous programming model to implement the processing pipeline for accelerated hash table lookups using the accelerator 154. Doing so allows the cores 108, 110 to be blocked after submitting a descriptor to the accelerator 154. Instead, the cores 108, 110 may continue to perform other useful tasks and receive the results by polling the accelerator 154 and/or an interrupt model of the accelerator 154 (e.g., the accelerator 154 may transmit the results via one or more interrupts to the processors 104, 106).

Figure 6:
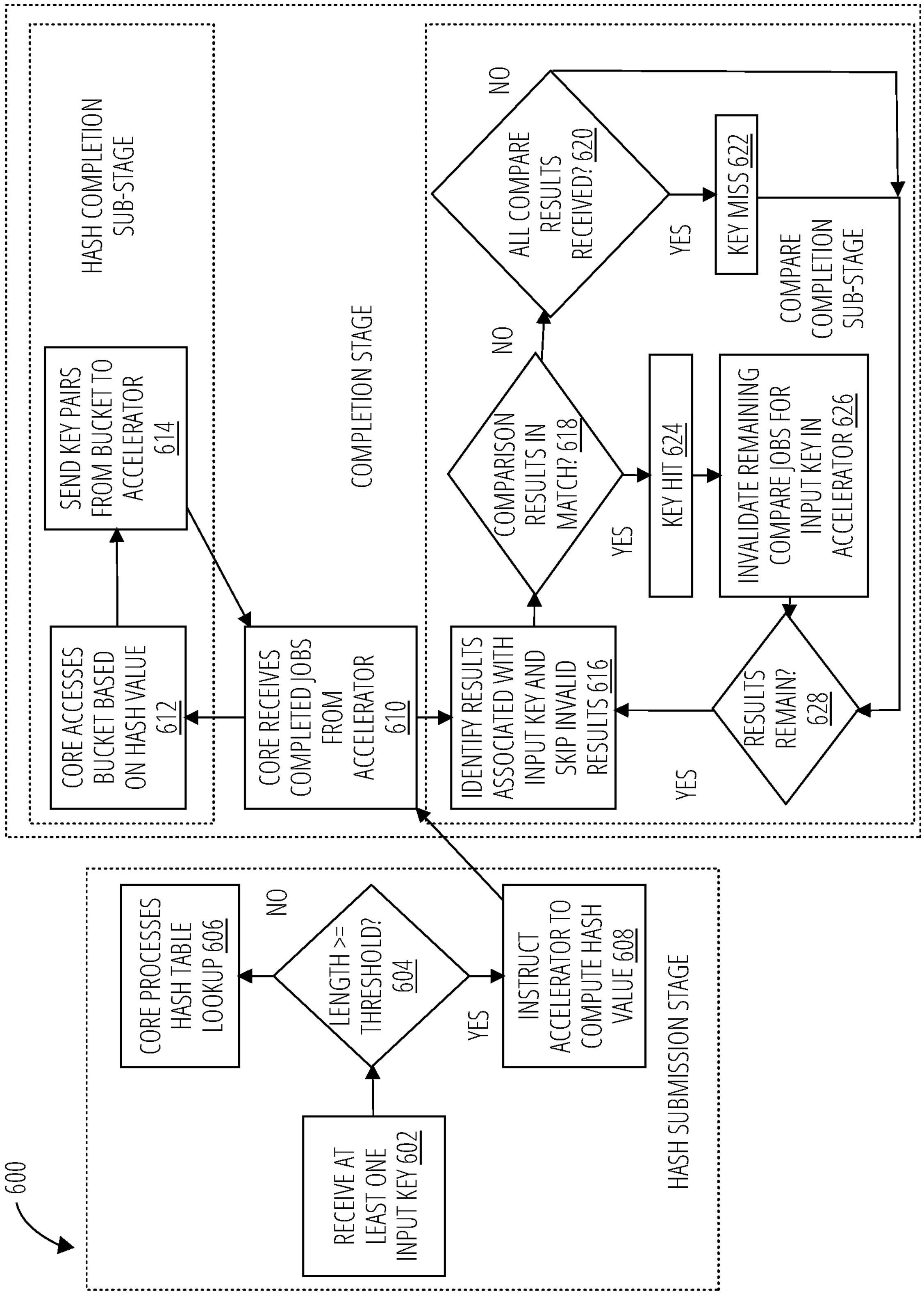
FIG. 6 illustrates an aspect of the subject matter in accordance with one embodiment.

FIG. 6 illustrates a logic flow 600. The logic flow 600 may be representative of some or all of the operations executed by one or more embodiments described herein. For example, the logic flow 600 may include some or all of the operations performed by performed by the system 100 to implement an asynchronous programming model for hash table lookups using the accelerator 154. For the sake of clarity, the logic flow 600 is described with reference to core 108 of processor 104. The embodiments are not limited in this context.

As shown, the asynchronous programming model may generally include two stages for hash table lookups, namely a hash submission stage and a completion stage. In the hash submission stage, the processors 104, 106 may offload hash computations to the accelerator 154 when the key length is greater than or equal to a predetermined threshold length. Otherwise, the processors 104, 106 may perform the hash lookup based on the input key (e.g., hash computation, comparing all key pairs in the identified bucket, and determining whether the comparisons result in a match).

For example, at block 602, the core 108 of processor 104 may receive at least one input key, e.g., an input key specified by software 186 for a hash table lookup in one of hash tables 184*a*-184*c*. At decision block 604, the core 108 of processor 104 determines whether the length of the input key exceeds the threshold length. If the length of the input key is less than the threshold, the logic flow 600 proceeds to block 606, where the core 108 of processor 104 completes the hash table lookup (e.g., hash computation, comparing all key pairs in the identified bucket, and determining whether the comparisons result in a match).

Returning to decision block 604, if the length of the input key is greater than or equal to the threshold, the hash table lookup may be offloaded to the accelerator 154 and the logic flow 600 proceeds to block 608. At block 608, the core 108 of processor 104 instructs the accelerator 154 to compute a hash value based on the input key, e.g., via a descriptor specifying a memory address of the input key and an opcode specifying to perform the hash computation. Advantageously, however, the core 108 of processor 104 is not blocked and may continue to perform other operations. Doing so may complete the hash submission stage. The logic flow 600 may then proceed to block 610, which is part of the completion stage.

At block 610, the core 108 of processor 104 receives completed jobs from the accelerator 154. As shown, the completion stage includes a hash completion sub-stage and a compare completion sub-stage. The completed jobs received at block 610 therefore include results from the hash completion sub-stage (e.g., hash values computed by the accelerator 154) and the completion stage (e.g., comparison results from the accelerator 154). As stated, block 610, the processor 104 may receive results from the accelerator 154 by polling (e.g., requesting) the results and/or receiving one or more interrupts from the accelerator 154, where each interrupt may specify one or more results. Doing so allows the core 108 of processor 104 to process hash value computation results and comparison results from the accelerator 154 without having to be blocked while waiting for results for a specific input key.

Generally, in the logic flow 600, the core 108 of processor 104 only processes returned results from the accelerator 154 in the completion stage rather than waiting for the accelerator 154 to finish processing all submitted jobs. The core 108 of processor 104 may then perform the hash completion sub-stage for each hash value computed by the accelerator 154. The core 108 of processor 104 may identify hash values computed for the input key by the accelerator 154 based on an indication in each completed job specifying that the job was for a hash computation based on the input key (e.g., a result including an indication of a hash value computed based on the input key).

For example, at block 612, the core 108 of processor 104 may access the bucket of a hash table based on the hash value received from the accelerator 154 based on the input key. The core then identifies all key addresses in the bucket having the index that matches the received hash value. At block 614, the core 108 of processor 104 instructs the accelerator 154 to perform comparison operations based on the input key and each key identified at block 612, e.g., in one or more descriptors (and/or a batch descriptor including a plurality of descriptors). Doing so may cause the accelerator 154 to perform the comparisons and end the hash completion sub-stage for the input key.

The core 108 of processor 104 may then receive one or more comparison results from the accelerator 154 at block 610 and perform the compare completion sub-stage for the comparison results. Generally, a comparison result received from the accelerator 154 may include an indication of the input key. Therefore, for comparison results received at block 616, the core 108 of processor 104 identifies all received comparison results that include an indication a completed hash computation based on the input key and skip any results marked invalid (e.g., results previously invalidated by the core 108 of processor 104 as described below). The core 108 of processor 104 may then perform the compare completion sub-stage for each compare result received from the accelerator 154. At decision block 618, the core 108 of processor 104 determines whether the current comparison result received from the accelerator 154 indicates that the comparison resulted in a match. If the comparison result received from the accelerator indicates the comparison resulted in a match, the logic flow 600 proceeds to block 624, where a hit on the input key is determined. The logic flow 600 then proceeds to block 626, where the core 108 of processor 104 invalidates any remaining compare jobs for the input key being processed (or awaiting processing) by the accelerator 154, as it is unnecessary to continue performing comparison operations when a hit has been detected. For example, the core 108 of processor 104 may transmit an instruction to cause the accelerator 154 to refrain from performing additional comparison jobs. As another example, the core 108 of processor 104 may mark pending jobs at the accelerator 154 as invalid to refrain from processing these results at block 616. The logic flow 600 may then proceed to decision block 628.

Returning to decision block 618, if the current comparison result indicates that the comparison did not result in a match, the logic flow 600 proceeds to block 620. At decision block 620, the core 108 of processor 104 determines whether all compare results for the input key have been received from the accelerator 154. If all compare results have been received, the logic flow 600 proceeds to block 622, where the core 108 of processor 104 determines a miss for the input key in the hash table 184*a*-184*c*. If all compare results have not been received, the logic flow 600 proceeds to block 628, and then to block 616, to process remaining compare results for the input key, as these additional compare results may indicate a hit.

At decision block 628, the core 108 of processor 104 determines whether additional comparison results for the input key remain. If additional comparison results remain, the logic flow 600 returns to block 616 to process the additional comparison results for the input key (or skip results invalidated at block 626). Otherwise, the logic flow 600 may end. Generally, when all compare results are processed, the core 108 of processor 104 finishes the completion stage and can then perform higher level functions. When the core is performing higher level functions the accelerator 154 may compute hash values and compare key pairs. Therefore, the core 108 of processor 104 and the accelerator 154 are asynchronous.

Although the comparators 182 of the accelerator 154 are efficient at performing comparison operations, the comparators 182 processing capabilities may become the bottleneck in a hash table lookup operation, especially when key sizes are large. Advantageously, embodiments disclosed herein may leverage an "expected result" feature of the accelerator 154 to efficiently minimize the comparison operations performed by the accelerator 154.

Figure 7:
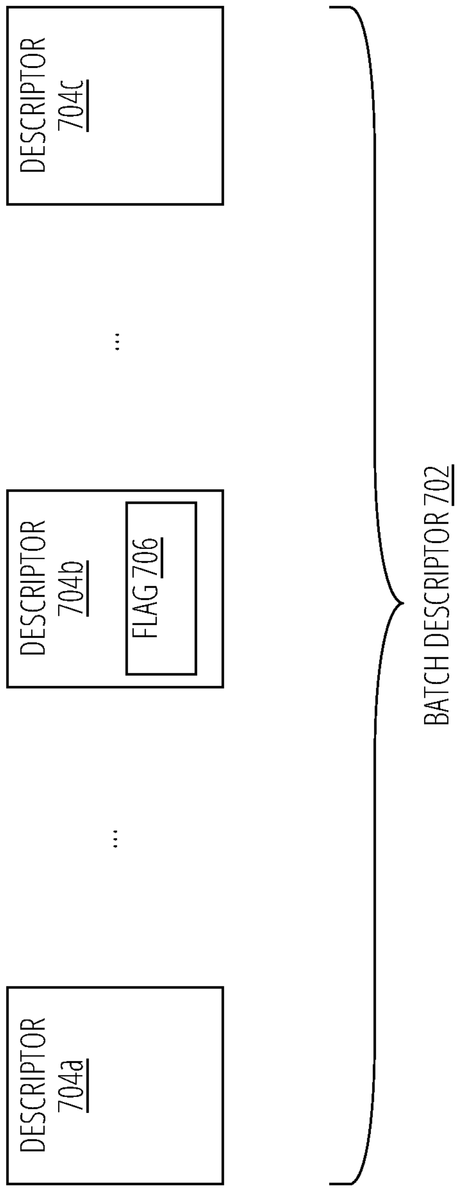
FIG. 7 illustrates an aspect of the subject matter in accordance with one embodiment.

FIG. 7 illustrates a batch descriptor 702, according to one embodiment. As shown, the batch descriptor 702 includes a plurality of descriptors 704*a*-704*c*. As stated, the processors 104, 106 may use descriptors to instruct the accelerator 154 to perform an operation, e.g., a hash computation operation and/or a comparison operation. Each descriptor 704*a*-704*c* may include an indication of the desired operation (e.g., an opcode) and memory addresses of any relevant parameters (e.g., an address of the input key for a hash computation operation, or the memory addresses of key pairs for a comparison operation).

When the accelerator 154 receives the batch descriptor 702, the accelerator may begin processing descriptors in order, e.g., beginning with descriptor 704*a*. However, for any input key's lookup operation, there may be several potential matching keys in a given bucket. These operations may be processed by generating descriptors for each comparison operation and having the accelerator 154 perform the comparison operations. For example, there may be 32 slots in a bucket (e.g., bucket 204*a*) and each slot may include a key. Therefore, to process a lookup for an input key, the processors 104, 106 may generate 32 comparison operations against the input key (via respective descriptors) which are submitted to the accelerator 154 for processing. However, the accelerator 154 may process each comparison operation to completion and the processors 104, 106 are unaware of any matches until all 32 comparison operations are completed. Doing so may result in waste of resources. For example, if the 1st key matches (e.g., corresponding to descriptor 704*a*), performing the remaining 31 comparison operations is unnecessary and results in wasting system resources.

Advantageously, however, descriptor 704*b* includes a flag 706 which indicates that the expected result feature of the accelerator 154 is enabled. Generally, the expected result flag 706 instructs the accelerator 154 to refrain from performing additional comparison operations when a match has been previously detected. For example, the comparison operations associated with descriptor 704*a* may result in a hit for the input key and the respective key from the bucket (or another descriptor between descriptors 704*a*, 704*b*).

Therefore, when the accelerator 154 processes descriptor 704*b* and detects the flag 706, the accelerator 154 may refrain from processing any further descriptors based on the hit detected when processing descriptor 704*a*. Doing so may allow the accelerator 154 to refrain from performing additional comparison operations, e.g., based on descriptors 704*b*, 704*c*, and any intervening descriptors.

The fence flag 706 may be set in any of the descriptors 704*a*-704*c* of the batch descriptor 702. In some embodiments, however, the triggering of the expected result feature via fence flag 706 forces the ordering of descriptors before and after the descriptor including the flag 706 (e.g., descriptor 704*b*), which is computationally expensive. As a result, there is a tradeoff between the benefit of avoiding unnecessary comparison operations and the reordering cost of the fence flag 706. Therefore, in some embodiments, the fence flag 706 is set in the middle descriptor of the batch descriptor 702. For example, if the batch descriptor 702 includes 32 descriptors, the fence flag 706 may be set at the 16th descriptor, e.g., descriptor 704*b*. Therefore, when there is a match (or hit) in the first half of the descriptors of the batch descriptor 702, the accelerator 154 can refrain from processing the remaining half of the descriptors of the batch descriptor 702. Doing so preserves the bandwidth of the accelerator 154, reduces hash table lookup latency, and increases the overall hash table lookup throughput of the system 100.

Although a batch descriptor 702 is used as a reference example, the fence flag 706 may be used in a plurality of individual descriptors that are not included in a batch descriptor 702 but are associated with the same input key. Embodiments are not limited in these contexts. Therefore, for example, if descriptors 704*a*-704*c* are not part of a batch descriptor 702, and accelerator 154 processes descriptor 704*b* and detects the flag 706, the accelerator 154 may refrain from processing any further descriptors based on the hit detected when processing descriptor 704*a*.

Advantageously, embodiments disclosed herein provide a new mechanism to leverage an integrated accelerator 154 device for hash table lookup acceleration. By providing an efficient, adaptive software/hardware pipeline that takes advantage of the expected result feature of the accelerator 154, the system 100 improves processing performance for hash table lookups relative to conventional systems.

Figure 8:
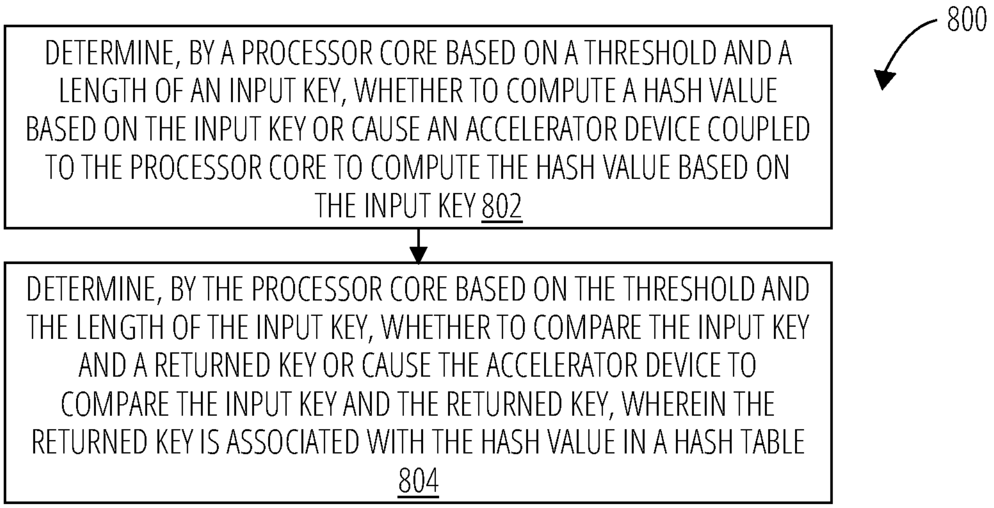
FIG. 8 illustrates a logic flow 800 in accordance with one embodiment.

FIG. 8 illustrates a logic flow 800. The logic flow 800 may be representative of some or all of the operations executed by one or more embodiments described herein. For example, the logic flow 800 may include some or all of the operations performed by performed by the system 100 to use the accelerator 154 to accelerate hash table lookups based on a hash threshold and a comparison threshold. For the sake of clarity, the logic flow 800 is described with reference to core 108 of processor 104. The embodiments are not limited in this context.

In block 802, logic flow 800 determines, by a processor core (e.g., software 186 executing on core 108 of processor 104) based on a threshold and a length of an input key, whether to compute a hash value based on the input key or cause the integrated accelerator device 154 coupled to the processor core 108 to compute the hash value based on the input key. The threshold may be a predetermined threshold that specifies a key length. If the length of the input key is greater than or equal to the threshold, the processor core 108 may cause the accelerator 154 to compute the hash value based on the input key, e.g., because the accelerator 154 is more efficient at computing the hash value relative to the processor core 108. Otherwise, if the length of the input key is less than the threshold, the core 108 of processor 104 may compute the hash value, as the benefit of having the accelerator 154 compute the hash value may be diminished by system overhead and/or latency.

In block 804, logic flow 800 determines, by the processor core 108 based on the threshold and the length of the input key, whether to compare the input key and a returned key or cause the accelerator device 154 to compare the input key and the returned key, wherein the returned key is associated with the hash value in a hash table (e.g., hash table 184*a*, 184*b*, or 184*c*). A result of the comparison may indicate whether there is a hit or a miss in the hash table 184*a*, 184*b*, or 184*c*. The threshold at block 804 may be the same as the threshold in block 802. The threshold at block 804 may be a different threshold than the threshold in block 802, where the threshold in block 802 is a hash threshold and the threshold in block 804 is a comparison threshold. In embodiments where a single threshold is used at block 802 and block 804, the greater of the hash threshold and the comparison threshold may be selected as the predetermined threshold. Advantageously, the logic flow 800 may allow the system 100 to process lookups more efficiently in the hash tables 184*a*, 184*b*, 184*c* using a model that offloads hash value and/or comparison computations to the accelerator 154 when the accelerator 154 would be more efficient than the processors 104, 106 in performing the hash value and/or comparison computations.

Figure 9:
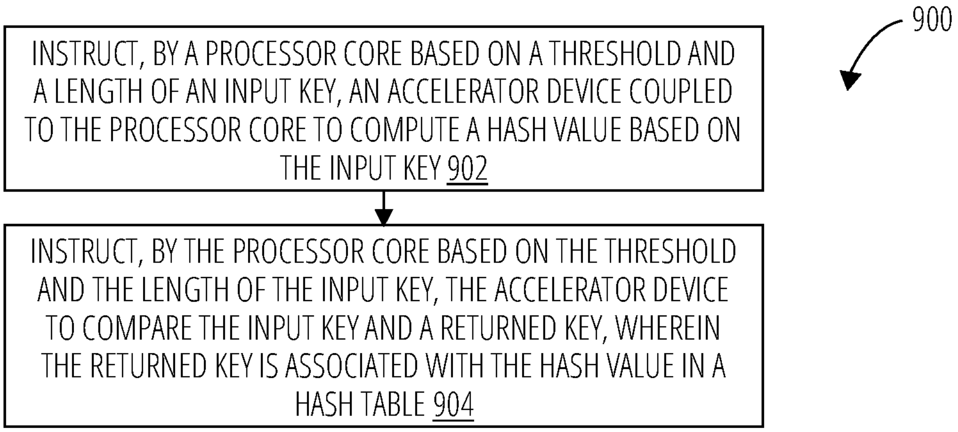
FIG. 9 illustrates a logic flow 900 in accordance with one embodiment.

FIG. 9 illustrates a logic flow 900. The logic flow 900 may be representative of some or all of the operations executed by one or more embodiments described herein. For example, the logic flow 900 may include some or all of the operations performed by performed by the system 100 to use the accelerator 154 to accelerate hash table lookups based on a hash threshold and a comparison threshold. For the sake of clarity, the logic flow 900 is described with reference to core 108 of processor 104. The embodiments are not limited in this context.

In block 902, logic flow 900 instructs, by a processor core (e.g., software 186 executing on core 108 of processor 104) based on a threshold and a length of an input key, an integrated accelerator device 154 coupled to the processor core 108 to compute a hash value based on the input key. For example, the processor core may determine that the length of the input key exceeds the threshold and instruct the accelerator 154 to compute the hash value based on the input key.

In block 904, logic flow 900 instructs, by the processor core 108 based on the threshold and the length of the input key, the accelerator 154 to compare the input key and a returned key, wherein the returned key is associated with the hash value in a hash table (e.g., hash table 184*a*, 184*b*, or 184*c*). For example, the processor core 108 may determine that the length of the input key exceeds the threshold and instruct the accelerator 154 to compare the input key and the returned key to determine if there is a hit or a miss in the hash table 184*a*, 184*b*, or 184*c*. The threshold at block 904 may be the same as the threshold in block 902. The threshold at block 904 may be a different threshold than the threshold in block 902, where the threshold in block 902 is a hash threshold and the threshold in block 804 is a comparison threshold. In embodiments where a single threshold is used at block 902 and block 904, the greater of the hash threshold and the comparison threshold may be selected as the predetermined threshold. Advantageously, the logic flow 900 may allow the system 100 to process lookups more efficiently in the hash tables 184*a*, 184*b*, 184*c* using a model that offloads hash value and/or comparison computations to the accelerator 154 when the accelerator 154 would be more efficient than the processors 104, 106 in performing the hash value and/or comparison computations.

Figure 10:
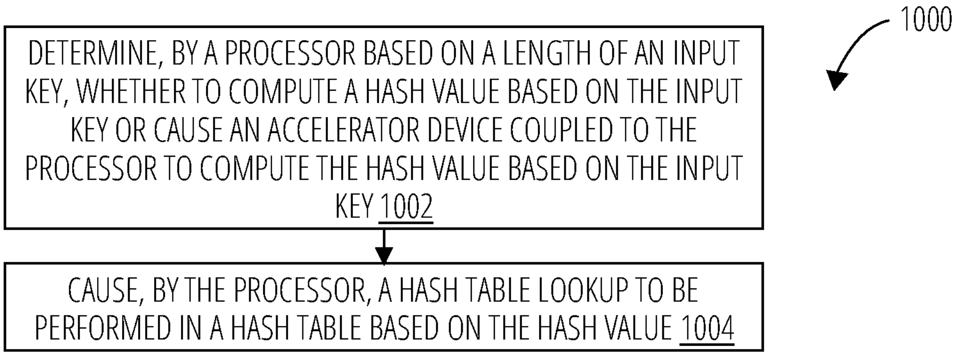
FIG. 10 illustrates a logic flow 1000 in accordance with one embodiment.

FIG. 10 illustrates a logic flow 1000. The logic flow 1000 may be representative of some or all of the operations executed by one or more embodiments described herein. For example, the logic flow 1000 may include some or all of the operations performed by performed by the system 100 to use the accelerator 154 to accelerate hash table lookups. The embodiments are not limited in this context.

In block 1002, logic flow 1000 determines, by a processor based on a length of an input key, whether to compute a hash value based on the input key or cause an accelerator device coupled to the processor to compute the hash value based on the input key. In block 1004, logic flow 1000 causes, by the processor, a hash table lookup to be performed in a hash table based on the hash value.

Figure 11:
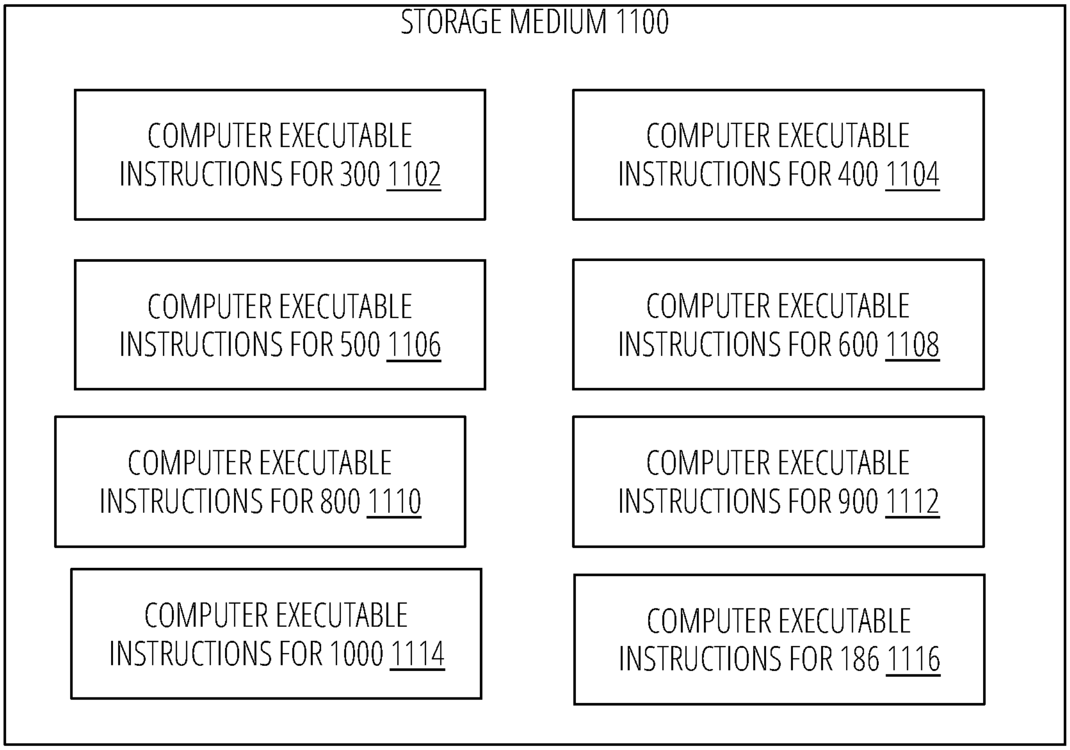
FIG. 11 illustrates an aspect of a storage medium in accordance with one embodiment.

FIG. 11 illustrates an embodiment of a storage medium 1100. Storage medium 1100 may comprise any non-transitory computer-readable storage medium or machine-readable storage medium, such as an optical, magnetic, or semiconductor storage medium. In various embodiments, storage medium 1100 may comprise an article of manufacture. In some embodiments, storage medium 1100 may store computer-executable instructions, such as computer-executable instructions to implement one or more of logic flows or operations described herein, such as instructions 1102, 1104, 1106, 1108, 1110, and 1112 for logic flows 300, 400, 500, 600, 800, 900, and 1000 of FIGS. 3-6 and 8-10, respectively. The storage medium 1100 may further store computer-executable computer executable instructions 1116 for software 186. The processors 104, 106 may execute any of the instructions in storage medium 1100. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The following examples pertain to further embodiments, from which numerous permutations and configurations will be apparent.

Example 1 includes an apparatus, comprising: an accelerator device; and a processor operable to execute one or more instructions to cause the processor to: determine, based on a length of an input key, whether to compute a hash value based on the input key or cause the accelerator device to compute the hash value based on the input key; and cause a hash table lookup to be performed in a hash table based on the hash value.

Example 2 includes the subject matter of example 1, wherein the processor determines to cause the accelerator device to compute the hash value, wherein the accelerator device computes the hash value based on the input key, the processor operable to execute one or more instructions to cause the processor to: receive, from the accelerator device, a plurality of results; determine that a first result of the plurality of results is associated with the input key, wherein the first result specifies a memory address of a returned key from the hash table; and transmit, to the accelerator device, an instruction to cause the accelerator device to compare the input key and the returned key.

Example 3 includes the subject matter of example 2, wherein the instruction to cause the accelerator device to compare the input key and the returned key is to comprise a descriptor, the descriptor to specify a memory address of the input key, the memory address of the returned key, and an indication of the comparison.

Example 4 includes the subject matter of example 3, wherein the accelerator device is to comprise circuitry configured to compare the input key and the returned key based on the memory address of the input key and the memory address of the returned key.

Example 5 includes the subject matter of example 4, the processor operable to execute one or more instructions to cause the processor to: receive, from the accelerator device based on the descriptor, a comparison result; and determine, based on the comparison result, whether there was a hit or a miss for the input key in the hash table.

Example 6 includes the subject matter of example 5, the processor operable to execute one or more instructions to cause the processor to: determine there was the hit for the input key in the hash table; receive, from the accelerator device, a second comparison result based on a comparison of the input key and a second returned key associated with a second result of the plurality of results; and refrain from processing the second comparison result based on the hit for the input key in the hash table.

Example 7 includes the subject matter of example 1, the instructions to cause the processor to cause the hash table lookup to be performed to comprise instructions to cause the processor to: determine, based on the length of the input key, whether to compare the input key and a returned key or cause the accelerator device to compare the input key and the returned key, wherein the returned key is associated with the hash value in the hash table.

Example 8 includes the subject matter of example 1, wherein the processor determines to cause the accelerator device to compute the hash value, wherein the accelerator device computes the hash value based on the input key, the processor operable to execute one or more instructions to cause the processor to: receive, from the accelerator device, a plurality of results associated with the hash value in the hash table, respective ones of the plurality of results associated with respective ones of a plurality of returned keys from the hash table; generate a batch descriptor comprising a plurality of descriptors, wherein a first descriptor of the plurality of descriptors is to comprise a flag; and transmit the batch descriptor to the accelerator device to cause the accelerator device to compare the input key to the respective returned key of the respective result.

Example 9 includes the subject matter of example 8, the accelerator device to comprise circuitry configured to: determine, based on a second descriptor of the plurality of descriptors, that the returned key matches the input key; identify the flag in the first descriptor; and refrain from processing the first descriptor based on the determination that the returned key matches the input key and the identification of the flag.

Example 10 includes a non-transitory computer-readable storage medium, the computer-readable storage medium including instructions that when executed by a processor, cause the processor to: determine, based on a length of an input key, whether to compute a hash value based on the input key or cause an accelerator device to compute the hash value based on the input key; and cause a hash table lookup to be performed in a hash table based on the hash value.

Example 11 includes the subject matter of example 10, wherein the processor determines to cause the accelerator device to compute the hash value based on the input key, wherein the instructions further cause the processor to: receive, from the accelerator device, a plurality of results; determine that a first result of the plurality of results is associated with the input key, wherein the first result specifies a memory address of a returned key from the hash table; and transmit, to the accelerator device, an instruction to cause the accelerator device to compare the input key and the returned key.

Example 12 includes the subject matter of example 11, wherein the instruction to cause the accelerator device to compare the input key and the returned key is to comprise a descriptor, the descriptor to specify a memory address of the input key, the memory address of the returned key, and an indication of the comparison.

Example 13 includes the subject matter of example 12, wherein the accelerator device is to comprise circuitry configured to compare the input key and the returned key based on the memory address of the input key and the memory address of the returned key.

Example 14 includes the subject matter of example 13, wherein the instructions further cause the processor to: receive, from the accelerator device based on the descriptor, a comparison result; and determine, based on the comparison result, whether there was a hit or a miss for the input key in the hash table.

Example 15 includes the subject matter of example 14, wherein the instructions further cause the processor to: determine there was the hit for the input key in the hash table; receive, from the accelerator device, a second comparison result based on a comparison of the input key and a second returned key associated with a second result of the plurality of results; and refrain from processing the second comparison result based on the hit for the input key in the hash table.

Example 16 includes the subject matter of example 10, wherein the instructions to cause the processor to cause the hash table lookup to be performed comprise instructions that when executed by the processor, cause the processor to: determine, based on the length of the input key, whether to compare the input key and a returned key or cause the accelerator device to compare the input key and the returned key, wherein the returned key is associated with the hash value in the hash table.

Example 17 includes the subject matter of example 10, wherein the processor determines to cause the accelerator device to compute the hash value, wherein the accelerator device computes the hash value based on the input key, wherein the instructions further cause the processor to: receive, from the accelerator device, a plurality of results associated with the hash value in the hash table, respective ones of the plurality of results associated with respective ones of a plurality of returned keys from the hash table; generate a batch descriptor comprising a plurality of descriptors, wherein a first descriptor of the plurality of descriptors is to comprise a flag; and transmit the batch descriptor to the accelerator device to cause the accelerator device to compare the input key to the respective returned key of the respective result.

Example 18 includes the subject matter of example 17, wherein the instructions further cause the accelerator to: determine, based on a second descriptor of the plurality of descriptors, that the returned key matches the input key; identify the flag in the first descriptor; and refrain from processing the first descriptor based on the determination that the returned key matches the input key and the identification of the flag.

Example 19 includes a method, comprising: determining, by a processor based on a length of an input key, whether to compute a hash value based on the input key or cause an accelerator device coupled to the processor to compute the hash value based on the input key; and causing, by the processor, a hash table lookup to be performed in a hash table based on the hash value.

Example 20 includes the subject matter of example 19, wherein the processor determines to cause the accelerator device to compute the hash value, wherein the accelerator device computes the hash value based on the input key, the method further comprising: receiving, by the processor from the accelerator device, a plurality of results; determining, by the processor, that a first result of the plurality of results is associated with the input key, wherein the first result specifies a memory address of a returned key from the hash table; and transmitting, by the processor to the accelerator device, an instruction to cause the accelerator device to compare the input key and the returned key.

Example 21 includes the subject matter of example 20, wherein the instruction to cause the accelerator device to compare the input key and the returned key is to comprise a descriptor, the descriptor to specify a memory address of the input key, the memory address of the returned key, and an indication of the comparison.

Example 22 includes the subject matter of example 21, wherein the accelerator device is to comprise circuitry configured to compare the input key and the returned key based on the memory address of the input key and the memory address of the returned key.

Example 23 includes the subject matter of example 21 or 22, further comprising: receiving, by the processor from the accelerator device based on the descriptor, a comparison result; and determining, by the processor based on the comparison result, whether there was a hit or a miss for the input key in the hash table.

Example 24 includes the subject matter of example 23, further comprising: determining, by the processor, there was the hit for the input key in the hash table; receiving, by the processor from the accelerator device, a second comparison result based on a comparison of the input key and a second returned key associated with a second result of the plurality of results; and refraining from processing, by the processor, the second comparison result based on the hit for the input key in the hash table.

Example 25 includes the subject matter of example 19, wherein causing the hash table lookup to be performed comprises: determining, by the processor based on the length of the input key, whether to compare the input key and a returned key or cause the accelerator device to compare the input key and the returned key, wherein the returned key is associated with the hash value in the hash table.

Example 26 includes the subject matter of example 19, wherein the processor determines to cause the accelerator device to compute the hash value, wherein the accelerator device computes the hash value based on the input key, the method further comprising: receiving, by the processor from the accelerator device, a plurality of results associated with the hash value in the hash table, respective ones of the plurality of results associated with respective ones of a plurality of returned keys from the hash table; generating, by the processor, a batch descriptor comprising a plurality of descriptors, wherein a first descriptor of the plurality of descriptors is to comprise a flag; and transmitting, by the processor, the batch descriptor to the accelerator device to cause the accelerator device to compare the input key to the respective returned key of the respective result.

Example 27 includes the subject matter of example 26, further comprising: determining, by the accelerator based on a second descriptor of the plurality of descriptors, that the returned key matches the input key; identifying, by the accelerator, the flag in the first descriptor; and refraining from processing, by the accelerator, the first descriptor based on the determination that the returned key matches the input key and the identification of the flag.

Example 28 includes an apparatus, comprising: means for determining, based on a length of an input key, whether to compute a hash value based on the input key or cause an accelerator device coupled to the processor to compute the hash value based on the input key; and means for causing a hash table lookup to be performed in a hash table based on the hash value.

Example 29 includes the subject matter of example 28, wherein the accelerator device computes the hash value based on the input key, the apparatus further comprising: means for receiving, from the accelerator device, a plurality of results; means for determining that a first result of the plurality of results is associated with the input key, wherein the first result specifies a memory address of a returned key from the hash table; and means for transmitting, to the accelerator device, an instruction to cause the accelerator device to compare the input key and the returned key.

Example 30 includes the subject matter of example 29, wherein the instruction to cause the accelerator device to compare the input key and the returned key is to comprise a descriptor, the descriptor to specify a memory address of the input key, the memory address of the returned key, and an indication of the comparison.

Example 31 includes the subject matter of example 30, wherein the accelerator device is to comprise means for comparing the input key and the returned key based on the memory address of the input key and the memory address of the returned key.

Example 32 includes the subject matter of example 31, further comprising: means for receiving, from the accelerator device based on the descriptor, a comparison result; and means for determining, based on the comparison result, whether there was a hit or a miss for the input key in the hash table.

Example 33 includes the subject matter of example 32, further comprising: means for determining there was the hit for the input key in the hash table; means for receiving, from the accelerator device, a second comparison result based on a comparison of the input key and a second returned key associated with a second result of the plurality of results; and means for refraining from processing the second comparison result based on the hit for the input key in the hash table.

Example 34 includes the subject matter of example 28, wherein causing the hash table lookup to be performed comprises: means for determining, based on the length of the input key, whether to compare the input key and a returned key or cause the accelerator device to compare the input key and the returned key, wherein the returned key is associated with the hash value in the hash table.

Example 35 includes the subject matter of example 28, wherein the accelerator device computes the hash value based on the input key, the apparatus further comprising: means for receiving, from the accelerator device, a plurality of results associated with the hash value in the hash table, respective ones of the plurality of results associated with respective ones of a plurality of returned keys from the hash table; means for generating a batch descriptor comprising a plurality of descriptors, wherein a first descriptor of the plurality of descriptors is to comprise a flag; and means for transmitting the batch descriptor to the accelerator device to cause the accelerator device to compare the input key to the respective returned key of the respective result.

Example 36 includes the subject matter of example 35, further comprising: means for determining, based on a second descriptor of the plurality of descriptors, that the returned key matches the input key; means for identifying the flag in the first descriptor; and means for refraining from processing the first descriptor based on the determination that the returned key matches the input key and the identification of the flag.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
an accelerator device; and
a processor operable to execute one or more instructions to cause the processor to:
determine, based on a threshold and a length of an input key, whether to compute a hash value based on the input key or cause the accelerator device to compute the hash value based on the input key, wherein the threshold is a predetermined threshold that specifies a key length which, when exceeded by the input key, causes the processor to offload hash computation operations to the accelerator device; and
cause a hash table lookup to be performed in a hash table based on the hash value.

2. The apparatus of claim 1, wherein the processor determines to cause the accelerator device to compute the hash value, wherein the accelerator device computes the hash value based on the input key, the processor operable to execute one or more instructions to cause the processor to:
receive, from the accelerator device, a plurality of results;
determine that a first result of the plurality of results is associated with the input key, wherein the first result specifies a memory address of a returned key from the hash table; and
transmit, to the accelerator device, an instruction to cause the accelerator device to compare the input key and the returned key.

3. The apparatus of claim 2, wherein the instruction to cause the accelerator device to compare the input key and the returned key is to comprise a descriptor, the descriptor to specify a memory address of the input key, the memory address of the returned key, and an indication of the comparison.

4. The apparatus of claim 3, wherein the accelerator device is to comprise circuitry configured to compare the input key and the returned key based on the memory address of the input key and the memory address of the returned key.

5. The apparatus of claim 4, the processor operable to execute one or more instructions to cause the processor to:
receive, from the accelerator device based on the descriptor, a comparison result; and
determine, based on the comparison result, whether there was a hit or a miss for the input key in the hash table.

6. The apparatus of claim 5, the processor operable to execute one or more instructions to cause the processor to:
determine there was the hit for the input key in the hash table;
receive, from the accelerator device, a second comparison result based on a comparison of the input key and a second returned key associated with a second result of the plurality of results; and
refrain from processing the second comparison result based on the hit for the input key in the hash table.

7. The apparatus of claim 1, the instructions to cause the processor to cause the hash table lookup to be performed to comprise instructions to cause the processor to:
determine, based on the length of the input key, whether to compare the input key and a returned key or cause the accelerator device to compare the input key and the returned key, wherein the returned key is associated with the hash value in the hash table.

8. The apparatus of claim 1, wherein the processor determines to cause the accelerator device to compute the hash value, wherein the accelerator device computes the hash value based on the input key, the processor operable to execute one or more instructions to cause the processor to:

receive, from the accelerator device, a plurality of results associated with the hash value in the hash table, respective ones of the plurality of results associated with respective ones of a plurality of returned keys from the hash table;

generate a batch descriptor comprising a plurality of descriptors, wherein a first descriptor of the plurality of descriptors is to comprise a flag; and transmit the batch descriptor to the accelerator device to cause the accelerator device to compare the input key to the respective returned key of the respective result.

9. The apparatus of claim 8, the accelerator device to comprise circuitry configured to:

determine, based on a second descriptor of the plurality of descriptors, that the returned key matches the input key;

identify the flag in the first descriptor; and refrain from processing the first descriptor based on the determination that the returned key matches the input key and the identification of the flag.

10. A non-transitory computer-readable storage medium, the computer-readable storage medium including instructions that when executed by a processor, cause the processor to:

determine, based on a threshold and a length of an input key, whether to compute a hash value based on the input key or cause the accelerator device to compute the hash value based on the input key, wherein the threshold is a predetermined threshold that specifies a key length which, when exceeded by the input key, causes the processor to offload hash computation operations to the accelerator device; and cause a hash table lookup to be performed in a hash table based on the hash value.

11. The non-transitory computer-readable storage medium of claim 10, wherein the processor determines to cause the accelerator device to compute the hash value based on the input key, wherein the instructions further cause the processor to:

receive, from the accelerator device, a plurality of results;

determine that a first result of the plurality of results is associated with the input key, wherein the first result specifies a memory address of a returned key from the hash table; and transmit, to the accelerator device, an instruction to cause the accelerator device to compare the input key and the returned key.

12. The non-transitory computer-readable storage medium of claim 11, wherein the instruction to cause the accelerator device to compare the input key and the returned key is to comprise a descriptor, the descriptor to specify a memory address of the input key, the memory address of the returned key, and an indication of the comparison.

13. The non-transitory computer-readable storage medium of claim 12, wherein the instructions further cause the processor to:

receive, from the accelerator device based on the descriptor, a comparison result; and determine, based on the comparison result, whether there was a hit or a miss for the input key in the hash table.

14. The non-transitory computer-readable storage medium of claim 13, wherein the instructions further cause the processor to:

determine there was the hit for the input key in the hash table;

receive, from the accelerator device, a second comparison result based on a comparison of the input key and a second returned key associated with a second result of the plurality of results; and refrain from processing the second comparison result based on the hit for the input key in the hash table.

15. The non-transitory computer-readable storage medium of claim 10, wherein the instructions to cause the processor to cause the hash table lookup to be performed comprise instructions that when executed by the processor, cause the processor to:

determine, based on the length of the input key, whether to compare the input key and a returned key or cause the accelerator device to compare the input key and the returned key, wherein the returned key is associated with the hash value in the hash table.

16. A method, comprising:

determining, by a processor based on a threshold and a length of an input key, whether to compute a hash value based on the input key or cause the accelerator device coupled to the processor to compute the hash value based on the input key, wherein the threshold is a predetermined threshold that specifies a key length which, when exceeded by the input key, causes the processor to offload hash computation operations to the accelerator device; and causing, by the processor, a hash table lookup to be performed in a hash table based on the hash value.

17. The method of claim 16, wherein the processor determines to cause the accelerator device to compute the hash value, wherein the accelerator device computes the hash value based on the input key, the method further comprising:

receiving, by the processor from the accelerator device, a plurality of results;

determining, by the processor, that a first result of the plurality of results is associated with the input key, wherein the first result specifies a memory address of a returned key from the hash table; and transmitting, by the processor to the accelerator device, an instruction to cause the accelerator device to compare the input key and the returned key.

18. The method of claim 17, wherein the instruction to cause the accelerator device to compare the input key and the returned key is to comprise a descriptor, the descriptor to specify a memory address of the input key, the memory address of the returned key, and an indication of the comparison.

19. The method of claim 18, wherein the accelerator device is to comprise circuitry configured to compare the input key and the returned key based on the memory address of the input key and the memory address of the returned key.

20. The method of claim 16, wherein causing the hash table lookup to be performed comprises:

determining, by the processor based on the length of the input key, whether to compare the input key and a returned key or cause the accelerator device to compare the input key and the returned key, wherein the returned key is associated with the hash value in the hash table.

* * * * *